United States Patent
Iwamoto et al.

(10) Patent No.: US 11,760,251 B2
(45) Date of Patent: Sep. 19, 2023

(54) DELIVERY VEHICLE AND DELIVERY SHELF

(71) Applicant: TOYOTA JIDOSHA KABUSHIKI KAISHA, Toyota (JP)

(72) Inventors: Kunihiro Iwamoto, Toyota (JP); Yuta Itozawa, Nagoya (JP); Hirotaka Komura, Tokyo-to (JP); Yutaro Takagi, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/487,126

(22) Filed: Sep. 28, 2021

(65) Prior Publication Data

US 2022/0105855 A1   Apr. 7, 2022

(30) Foreign Application Priority Data

Oct. 2, 2020  (JP) .................. 2020-168116

(51) Int. Cl.
*B60P 1/52* (2006.01)
*A47G 29/14* (2006.01)
*A47G 29/30* (2006.01)

(52) U.S. Cl.
CPC .............. *B60P 1/52* (2013.01); *A47G 29/141* (2013.01); *A47G 29/30* (2013.01)

(58) Field of Classification Search
CPC ........ B66F 9/18; B60P 1/6427; B60P 1/6481; B60P 1/065; B60P 1/52; B60P 3/007
See application file for complete search history.

(56) References Cited

U.S. PATENT DOCUMENTS

| | | |
|---|---|---|
| 5,016,948 A | 5/1991 | Welch et al. |
| 10,459,450 B2 | 10/2019 | Sibley |
| 11,051,613 B1 | 7/2021 | Gilbreath |
| 11,338,430 B2* | 5/2022 | Kato ...................... B61B 13/00 |
| 2005/0029029 A1 | 2/2005 | Thorne |
| 2006/0216966 A1 | 9/2006 | Selek |
| 2017/0079431 A1 | 3/2017 | Nilsson et al. |
| 2019/0239673 A1 | 8/2019 | Silva |
| 2021/0116924 A1* | 4/2021 | Etou .................... G05D 1/0212 |
| 2022/0106117 A1* | 4/2022 | Matsushita .......... G05D 1/0219 |
| 2022/0258658 A1* | 8/2022 | Iwamoto ................. B60P 1/649 |
| 2022/0371499 A1* | 11/2022 | Perez .................... B60P 1/6427 |

FOREIGN PATENT DOCUMENTS

| | | |
|---|---|---|
| CN | 111184364 A | 5/2020 |
| DE | 19624892 A1 | 1/1998 |
| JP | 2003-038336 A | 2/2003 |

* cited by examiner

*Primary Examiner* — Kaitlin S Joerger

(74) *Attorney, Agent, or Firm* — Dinsmore & Shohl LLP

(57) ABSTRACT

A first exemplary aspect is a delivery shelf includes: a housing; and a plurality of pairs of supports extended inside the housing in a depth direction thereof and arranged inside the housing at regular intervals in a height direction thereof. The delivery shelf is capable of housing all of returnable containers for delivery of a plurality of predefined sizes along the plurality of respective pairs of supports, and is installed in a house.

6 Claims, 9 Drawing Sheets

DELIVERY VEHICLE AND DELIVERY SHELF

CROSS REFERENCE TO RELATED APPLICATIONS

This application is based upon and claims the benefit of priority from Japanese patent application No. 2020-168116, filed on Oct. 2, 2020, the disclosure of which is incorporated herein in its entirety by reference.

BACKGROUND

The present disclosure relates to a delivery vehicle and a delivery shelf. There has been a demand to make delivery of an article automated and more efficient. United States Patent Publication No. 2005/0029029 discloses a method for delivering an article using a delivery vehicle that can autonomously travel.

Incidentally, a method for storing an article in a returnable container (also referred to as a "returnable box") and delivering the stored article has been widely known.

SUMMARY

The inventors have found the following problem in the delivery using a returnable container.

In order to deliver articles of various sizes, it is more efficient to use returnable containers of a plurality of predefined sizes instead of returnable containers of a uniform size, so that it is possible to deliver more articles using less space.

However, when the returnable containers of a plurality of predefined sizes are used as described above, the configuration of a delivery vehicle for loading returnable containers and delivering them and that of a delivery shelf for receiving the returnable containers at a delivery destination need to be further improved.

The present disclosure has been made in view of the above-described circumstances, and an object thereof is to provide a delivery vehicle and a delivery shelf that are capable of improving the efficiency of the delivery using returnable containers of a plurality of predefined sizes.

A first exemplary aspect is a delivery shelf including:
a housing; and
a plurality of pairs of supports extended inside the housing in a depth direction thereof and arranged inside the housing at regular intervals in a height direction thereof, in which
the delivery shelf is capable of housing all of returnable containers for delivery of a plurality of predefined sizes along the plurality of respective pairs of supports, and
the delivery shelf is installed in a house.

Further, another exemplary aspect is a delivery vehicle including:
a housing; and
a plurality of pairs of supports extended inside the housing in a depth direction thereof and arranged inside the housing at regular intervals in a height direction thereof; and
a shelf capable of housing all of returnable containers for delivery of a plurality of predefined sizes along the plurality of respective pairs of supports.

As described above, in one aspect of the present disclosure, a plurality of pairs of supports arranged inside the housing at regular intervals in the height direction thereof are provided, and all returnable containers for delivery of a plurality of predefined sizes can be housed along the plurality of respective pairs of supports. Therefore, it is possible to improve the efficiency of the delivery using the returnable containers of a plurality of predefined sizes.

A projecting part that projects outward from each of the returnable containers in a width direction thereof may slide on each of the plurality of pairs of supports.

Further, a roller may be provided on a surface of each of the plurality of pairs of supports on which the projecting part slides. By the above configuration, it is possible to reduce the friction coefficient between the projecting part of the returnable container and the support and prevent abrasion powder from being generated by the sliding of the projecting part.

The delivery shelf may further include a lock mechanism configured to lock the returnable container when the returnable container is housed. By the above configuration, it is possible to fix the returnable container to the housing.

The lock mechanism may be provided so as to face each of the plurality of pairs of supports and allow the projecting part of each of the returnable containers to slide, and a roller may be provided on a surface of the lock mechanism on which the projecting part slides. By the above configuration, it is possible to reduce the friction coefficient between the projecting part of the returnable container and the lock mechanism and prevent abrasion powder from being generated by the sliding of the projecting part.

A gutter may be provided below each of the plurality of pairs of supports, the gutter being extended in parallel with each of the plurality of pairs of the supports. The gutter makes it possible to catch abrasion powder generated by the sliding of the projecting part of the returnable container and the support, a lubricant of the support, and the like. Therefore, it is possible to prevent abrasion powder and a lubricant from entering inside returnable containers that are positioned below the returnable container of which the projecting part has slid.

The delivery shelf may be provided so as to penetrate an outer wall of the house and may allow the returnable container to be put into the delivery shelf and taken out of the delivery shelf from outside and inside the house, and the delivery shelf may further include: an outer door capable of being opened and closed, the outer door being provided outside the house; an inner door capable of being opened and closed, the inner door being provided inside the house; and an interlock mechanism configured to prevent the outer door and the inner door from being simultaneously opened. By the above configuration, it is possible to protect the privacy of residents of the house.

The delivery vehicle may be an autonomous traveling vehicle. By the above configuration, it is possible to reduce the cost for delivery.

According to the present disclosure, it is possible to provide a delivery vehicle and a delivery shelf that are capable of improving the efficiency of the delivery using returnable containers of a plurality of predefined sizes.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
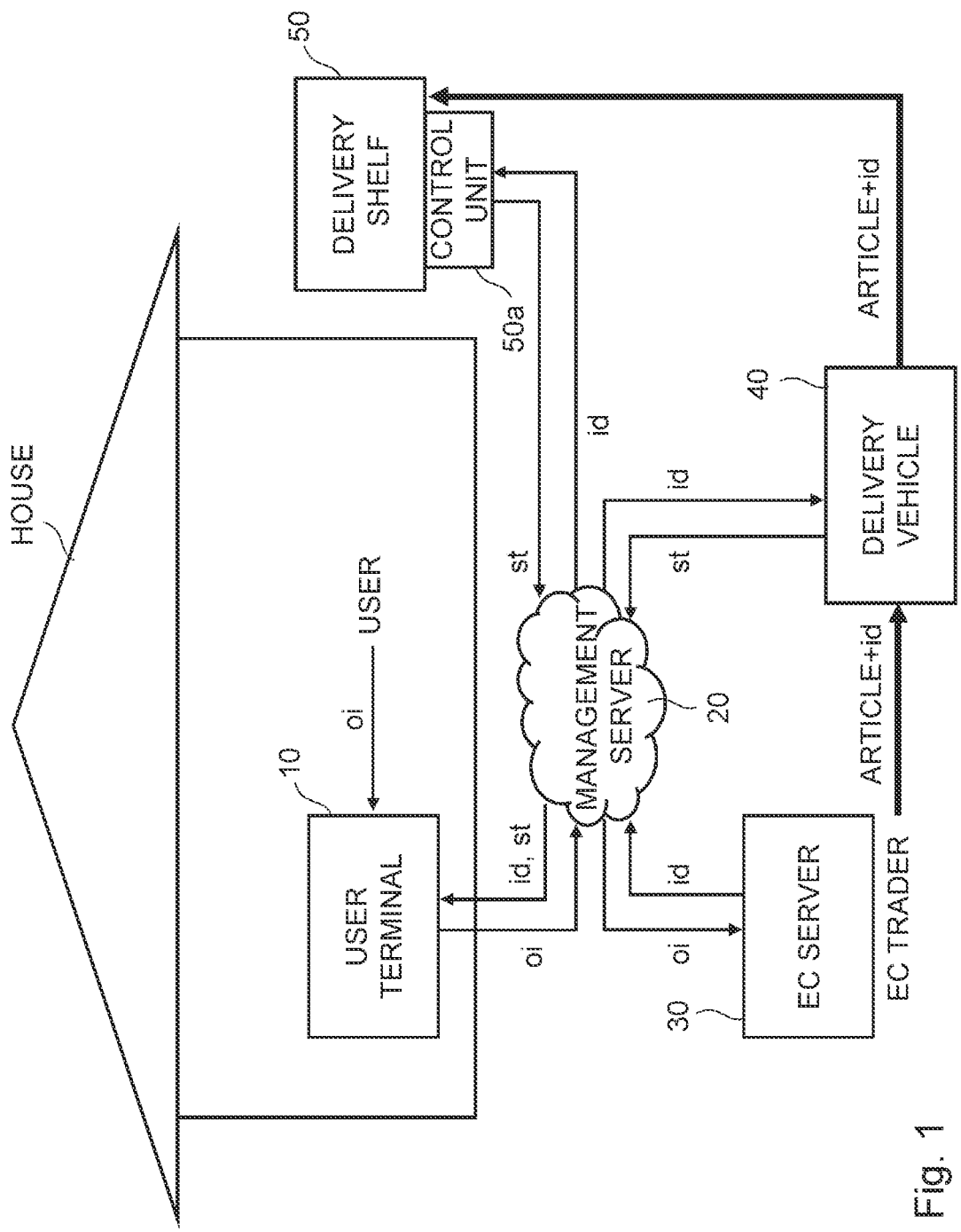
FIG. 1 is a block diagram of a delivery management system using a delivery vehicle and a delivery shelf according to a first embodiment.

Specific embodiments will be described hereinafter in detail with reference to the drawings. The same or corresponding elements are denoted by the same reference numerals or symbols throughout the drawings, and redundant descriptions thereof are omitted as appropriate for clarifying the descriptions.

First Embodiment

<Configuration of Delivery Management System>

First, a delivery management system using a delivery vehicle and a delivery shelf according to a first embodiment will be described with reference to FIG. 1. FIG. 1 is a block diagram of the delivery management system using the delivery vehicle and the delivery shelf according to the first embodiment.

The delivery management system is a delivery management system that manages delivery of ordered articles by using a computer. In the delivery management system according to this embodiment, for example, articles are stored in returnable containers for delivery of a plurality of predefined sizes in accordance with the sizes of the articles and then delivered.

The returnable container is not limited to being made of any particular material, and is made of, for example, plastic, a corrugated cardboard, wood, and metal, and is repeatedly used.

As shown in FIG. 1, the delivery management system according to this embodiment includes a user terminal 10, a management server 20, an Electronic Commerce (EC) server 30, a delivery vehicle 40, and a delivery shelf 50. Note that the delivery shelf 50 includes a control unit 50a that performs various controls regarding the delivery shelf 50.

Each of the user terminal 10, the management server 20, the EC server 30, the delivery vehicle 40, and the control unit 50a includes, for example, an arithmetic unit such as a Central Processing Unit (CPU), and a storage unit such as a Random Access Memory (RAM) and a Read Only Memory (ROM) in which various control programs, data, and the like are stored. That is, each of the management server 20, the EC server 30, the delivery vehicle 40, and the control unit 50a has a function as a computer, and performs the below-described processes based on the aforementioned various control programs.

As shown in FIG. 1, the user terminal 10 is a communication terminal that is connected to the management server 20 through a wire or wirelessly so as to be able to communicate with the management server 20. The user terminal 10 is not limited to any particular apparatuses and the like as long as it can communicate with the management server 20, and may be, for example, a mobile communication terminal such as a smartphone or a tablet-type terminal, or a PC (Personal Computer) disposed indoors.

Note that although the user terminal 10 is located in a living space of a house in FIG. 1, it may be located outside the house, or outside the living space in the house.

Further, in this specification, the meaning of the term "house" includes an apartment building, an office building, and the like, and the meaning of the term "living space" includes an office space.

As shown in FIG. 1, the user enters order information oi into the user terminal 10. The order information oi is then transmitted from the user terminal 10 to the management server 20. The order information oi is information about an article(s) to be delivered, and includes, for example, information such as a name of the article, a quantity, a desired delivery date and time, a delivery destination (an address), and the like.

The management server 20 is a server that manages the delivery management system. As shown in FIG. 1, the management server 20 is connected to the user terminal 10, the EC server 30, the delivery vehicle 40, and the control unit 50a of the delivery shelf 50 so as to be able to communicate with them. The management server 20 is, for example, a cloud server. The management server 20 transmits the order information oi received from the user terminal 10 to the EC server 30.

Further, the management server 20 receives order identification information id issued by the EC server 30 and transmits the received order identification information id to the user terminal 10, the delivery vehicle 40, and the control unit 50a of the delivery shelf 50. The order identification information id is information for identifying the article to be delivered, and is, for example, an order number thereof.

Further, the management server 20 receives status information st indicating a delivery status of the article from the delivery vehicle 40 and the control unit 50a of the delivery shelf 50 and transmits the received status information st to the user terminal 10. The status information st includes, for example, information such as "Waiting to be delivered", "In-delivering" or "Delivered" as the delivery status of the article.

The EC server 30 is, for example, a server constituting an EC site on the Internet managed by an EC trader. As shown in FIG. 1, the EC server 30, which is connected to the management server 20 so as to be able to communicate with the management server 20, issues order identification information id according to the order information oi received from the management server 20 and transmits the issued order identification information id to the management server 20.

The delivery vehicle 40 is a vehicle that transports articles.

Figure 2:
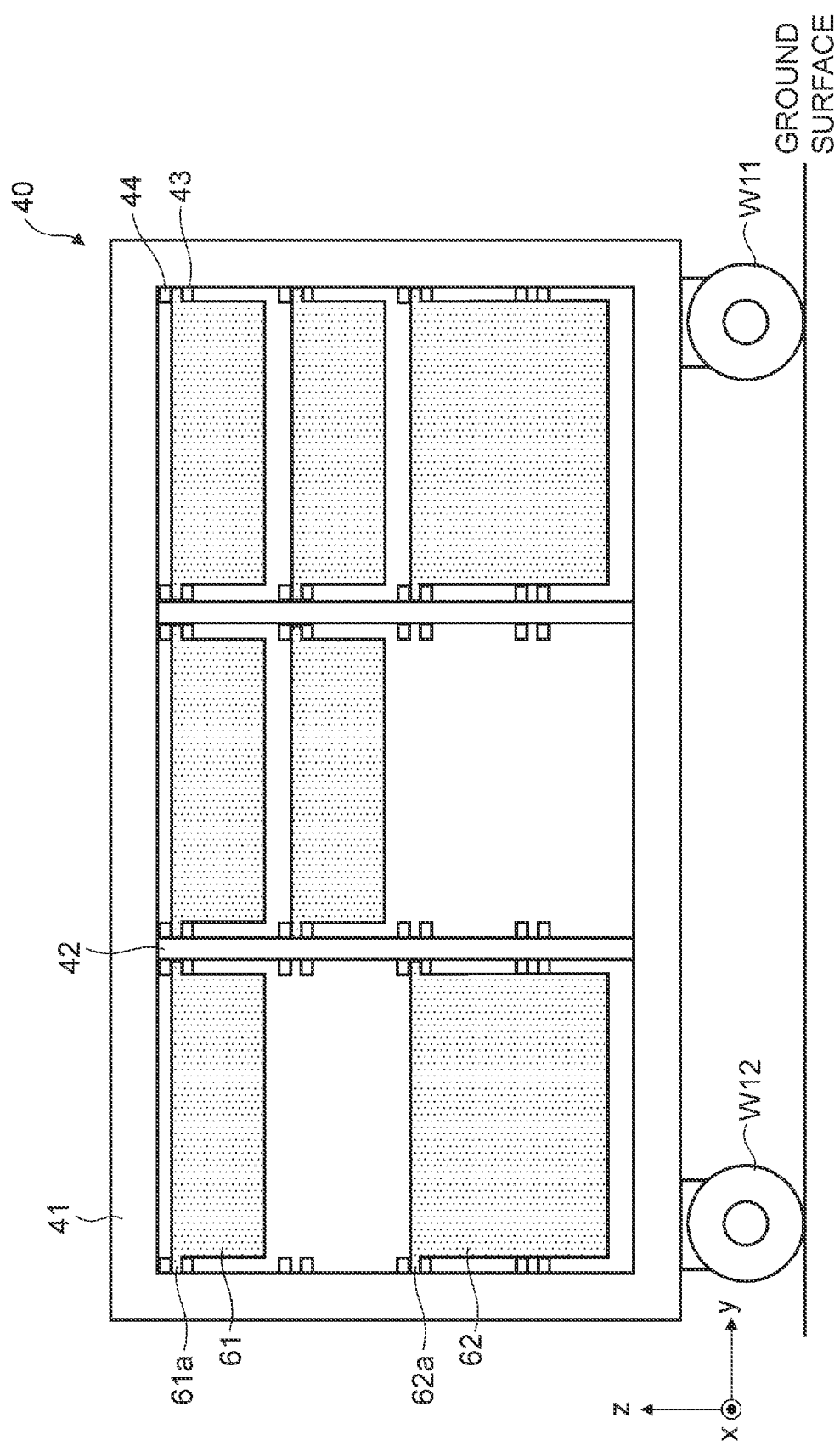
FIG. 2 is a schematic side view of the delivery vehicle according to the first embodiment.

Here, FIG. 2 is a schematic side view of the delivery vehicle according to the first embodiment.

Note that it is needless to say that right-handed xyz orthogonal coordinates shown in FIG. 2 and other drawings are merely for convenience of describing the positional relation of the components. Normally, a z-axis positive direction is vertically upward and a xy plane is a horizontal plane, which are the same throughout the drawings.

As shown in FIG. 2, the delivery vehicle 40 includes a housing (a main body) 41 and a plurality of pairs of rails (supports) 43 extended inside the housing 41 in the depth direction thereof (the x-axis direction) and arranged inside the housing 41 at regular intervals in the height direction thereof (the z-axis direction). That is, the delivery vehicle 40 includes a shelf capable of housing all of returnable containers 61 and 62 of a plurality of predefined sizes along the respective rails 43.

Therefore, it is possible to improve the efficiency of the delivery using the returnable containers 61 and 62 of a plurality of predefined sizes.

Note that the returnable containers 61 and 62 are indicated by hatching to make understanding easier although FIG. 2 is a side view.

The delivery vehicle 40 is, for example, an autonomous traveling (unmanned traveling) vehicle. By using an autonomous traveling vehicle, it is possible to reduce the cost for delivery. The delivery vehicle 40 can travel, for example, not only on a roadway but also on a sidewalk or the like, and can deliver the returnable containers 61 and 62 to the vicinity of the delivery shelf 50.

Note that, for example, when the delivery vehicle 40 can no longer travel autonomously, it may be remotely operated. Further, a deliverer (i.e., a person or the like who delivers articles) may drive the delivery vehicle 40 and deliver the articles, that is, the returnable containers 61 and 62, from the delivery vehicle 40 to the delivery shelf 50.

Details of the configuration of the delivery vehicle 40 will be described later.

For example, articles are stored in the returnable containers 61 and 62 and the order identification information id is attached to each of these containers, and then the articles are delivered. The order identification information id attached to each of the returnable containers 61 and 62 is, for example, text (i.e., letters), a symbol, a bar code, a two-dimensional code, a Radio Frequency IDentifier (FRID), or the like.

The delivery vehicle 40 includes, for example, a reader (not shown) capable of reading the order identification information id attached to each of the returnable containers 61 and 62.

Further, as shown in FIG. 1, the delivery vehicle 40 is wirelessly connected to the management server 20 so as to be able to communicate with the management server 20. The delivery vehicle 40 receives the order identification information id from the management server 20, and then transmits the status information st indicating the delivery status of each of the returnable containers 61 and 62 (i.e., the articles) to the management server 20.

Here, as shown in FIG. 1, the returnable containers 61 and 62 in which the articles are stored and to which pieces of the order identification information id are attached are delivered from the EC trader to the delivery shelf 50 of the delivery destination by the delivery vehicle 40.

For example, the status information st indicating the delivery status of the articles is "Waiting to be delivered" in a period from when the delivery vehicle 40 receives the order identification information id to when it receives the articles from the EC trader.

When the delivery vehicle 40 receives the articles from the EC trader and the delivery vehicle 40 reads the order identification information id attached to each of the returnable containers 61 and 62 in which the articles are stored, the status information st changes to "In-delivering".

The delivery shelf 50 is a shelf allowing the returnable containers 61 and 62 of a plurality of predefined sizes to be put into it and taken out of it, and is a shelf similar to that included in the delivery vehicle 40.

Further, the delivery shelf 50 includes, for example, a reader (not shown) capable of reading the order identification information id attached to each of the returnable containers 61 and 62.

Figure 3:
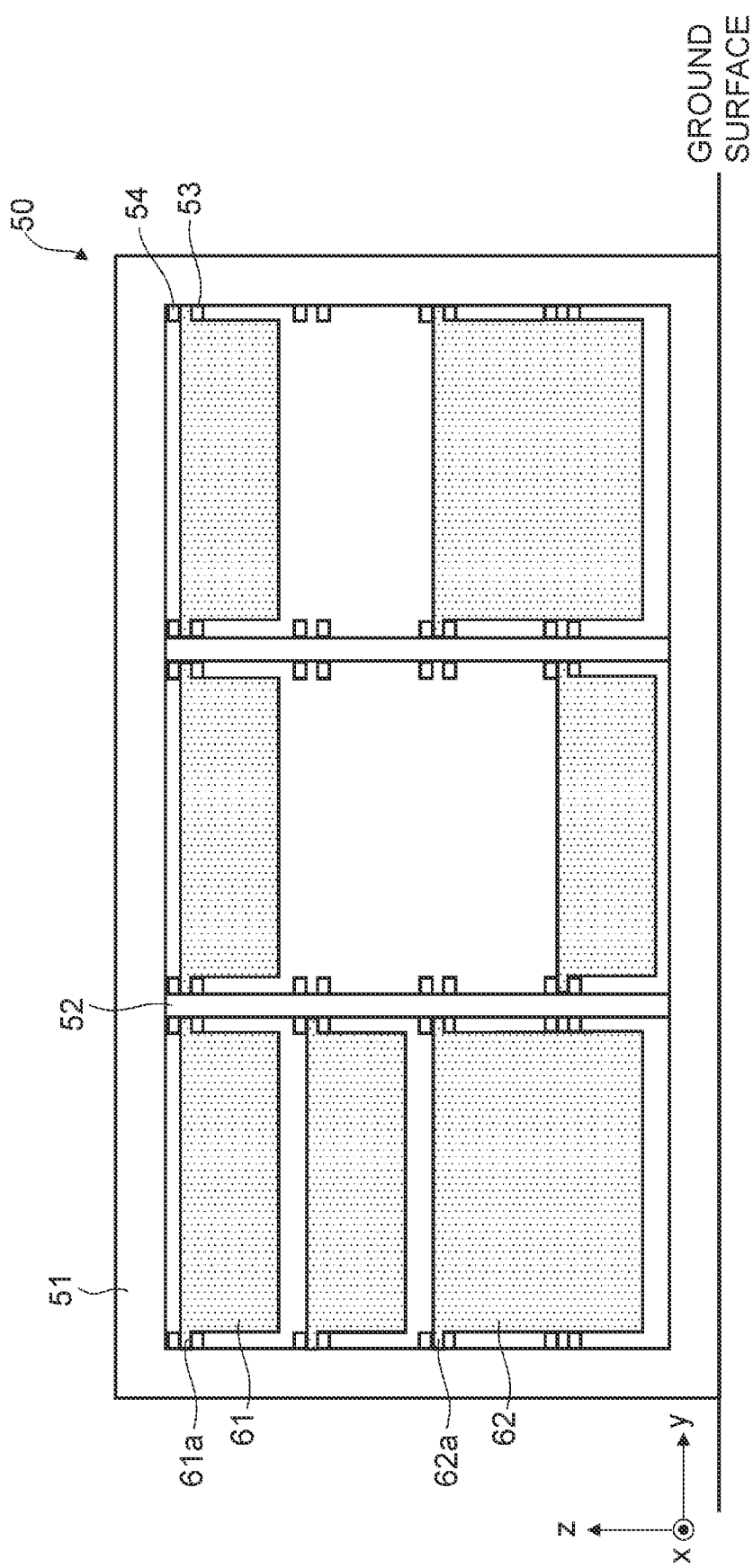
FIG. 3 is a schematic front view of the delivery shelf according to the first embodiment.

FIG. 3 is a schematic front view of the delivery shelf according to the first embodiment. As shown in FIG. 3, the delivery shelf 50 includes a housing 51 and a plurality of pairs of rails 53 extended inside the housing 51 in the depth direction thereof (the x-axis direction) and arranged inside the housing 51 at regular intervals in the height direction thereof (the z-axis direction). That is, the delivery shelf 50 is a shelf capable of housing all of the returnable containers 61 and 62 of a plurality of predefined sizes.

Therefore, it is possible to improve the efficiency of the delivery using the returnable containers of a plurality of predefined sizes.

Note that, in the delivery shelf 50, the empty returnable containers 61 and 62 from which the articles have been taken out are collected as appropriate by the delivery vehicle 40. Further, the empty returnable containers 61 and 62 are indicated by hatching to make understanding easier although FIG. 3 is a front view.

Details of the configuration of the delivery shelf 50 will be described later.

As shown in FIG. 1, the control unit 50a of the delivery shelf 50 is wirelessly connected to the management server 20 so as to be able to communicate with the management server 20. The control unit 50a of the delivery shelf 50 receives the order identification information id from the management server 20, and transmits the status information st indicating the delivery status of each of the returnable containers 61 and 62 (i.e., the articles) to the management server 20.

When the returnable containers 61 and 62 (i.e., the articles) are put into the delivery shelf 50 and the order identification information id attached to each of the returnable containers 61 and 62 is read by, for example, a reader of the delivery shelf 50, the status information st changes to "Delivered".

Further, when the person who receives the articles takes out the articles from the returnable containers 61 and 62 housed in the delivery shelf 50 and reads the order identification information id attached to each of the returnable containers 61 and 62, the status information st may change to "Received" or the like.

Further, when the delivery vehicle 40 collects the empty returnable containers 61 and 62 and reads the order identification information id attached to each of the returnable containers 61 and 62, the status information st may change to "Collected" or the like.

In this way, the status information st can be used to find out, for example, the availability and the collection status (i.e., the availability of the housing space in the delivery shelf 50) of the returnable containers 61 and 62 in the delivery shelf 50.

Note that the status information st is not indispensable. On the other hand, the status information st may also be transmitted to the EC server 30.

Further, the transportation of the returnable containers 61 and 62 (i.e., the articles) from the delivery vehicle 40 to the delivery shelf 50 may be performed by, for example, a person such as an superintendent of an apartment building, or may be performed by a transportation robot not shown in FIG. 1.

In the example of FIG. 1, the delivery shelf 50 is provided outside the house. Examples of places outside the house where the delivery shelf 50 may be installed include an entrance, a corridor, or the like of an apartment building. Further, the delivery shelf 50 may be provided indoors as long as it is installed in the house.

Note that the delivery shelf 50 may be provided so as to penetrate an outer wall of the house. By this configuration, it is possible to put the delivered returnable containers 61 and 62 into the delivery shelf 50 from outside the house and take the returnable containers 61 and 62 out of the delivery shelf 50 in the living space. In this case, for example, an outer door and an inner door (not shown) capable of being opened and closed may be provided on the outdoor side and the indoor side, respectively, of the delivery shelf 50, and an interlock mechanism that prevents the outer door and the inner door from being simultaneously opened may be provided. It is thus possible to protect the privacy of residents of the house.

As described above, the delivery vehicle 40 and the delivery shelf 50 according to this embodiment include the plurality of pairs of rails 43 and the plurality of pairs of rails 53, respectively, which are extended inside the respective housings in the depth direction thereof and are arranged inside the respective housings at regular intervals in the height direction thereof. Therefore, it is possible to house all of the returnable containers 61 and 62 of a plurality of predefined sizes along the respective rails 43 and 53. Therefore, it is possible to improve the efficiency of the delivery using the returnable containers 61 and 62 of a plurality of predefined sizes.

<Configuration of Delivery Vehicle 40>

Next, the configuration of the delivery vehicle 40 will be described in detail with reference to FIG. 2.

As shown in FIG. 2, the delivery vehicle 40 includes wheels W11 and W12, the housing 41, partition plates 42, the rails 43, and lock mechanisms 44.

The two pairs of the wheels W11 and W12 are rotatably fixed to the underside of the housing 41 and are driven by a drive source (not shown) such as a motor.

The housing 41 constitutes a main body of the delivery vehicle 40. In the example shown in FIG. 2, the housing 41 has a configuration in which a top plate provided on the z-axis direction positive side, a bottom plate provided on the z-axis direction negative side, a front plate provided on the y-axis direction positive side, and a rear plate provided on the y-axis direction negative side are integrally formed. That is, both of the side surfaces of the housing 41 are opened so that the returnable containers 61 and 62 can be put into the housing 41 and taken out of the housing 41.

Note that doors capable of being opened and closed may be provided on both of the open side surfaces of the housing 41. Further, one of the side surfaces of the housing 41 may be closed.

As shown in FIG. 2, the partition plate 42 is provided in parallel with the front and rear plates constituting the housing 41 (i.e., in parallel with an xz plane) and provided so as to be extended from one side surface of the housing 41 to the other side surface thereof.

Here, each of the partition plates 42 are provided so that an interval between the front plate of the housing 41 and the adjacent partition plate 42, an interval between the rear plate of the housing 41 and the adjacent partition plate 42, and an interval between the partition plates 42 become equal to each other.

Note that, in the example of FIG. 2, although two partition plates 42 are provided, the number of partition plates 42 is not limited to any particular number. Further, the partition plate 42 may not be provided.

As shown in FIG. 2, the plurality of pairs of rails 43 are extended on the inner surface of the housing 41 and the partition plate 42 in the depth direction (x-axis direction) thereof and are arranged on the inner surface of the housing 41 and the partition plate 42 at regular intervals in the height direction (z-axis direction) thereof. Here, the rail 43 is provided so as to rise substantially vertically from the inner surface of the housing 41 and the partition plate 42.

Note that the rails 43 only need to support the returnable containers 61 and 62, and therefore they may be extended discontinuously in the depth direction (x-axis direction). Alternatively, instead of the rails 43, short supports may be disposed so that they are aligned in the depth direction (x-axis direction). Further, supports may be comprised of a magnet, so that they attract part or the whole of the returnable containers 61 and 62.

As shown in FIG. 2, projecting parts 61a and 62a that project outward from the returnable containers 61 and 62, respectively, in the width direction thereof slide on the respective pairs of adjacent rails 43 that face each other, whereby the returnable containers 61 and 62 can be put into the housing 41 and taken out of the housing 41.

As described above, the delivery vehicle 40 includes a shelf allowing all of the returnable containers 61 and 62 of a plurality of predefined sizes to be put into it and taken out of it.

In this embodiment, the widths of the returnable containers 61 and 62 of a plurality of predefined sizes in the y-axis direction are the same as each other, and the depths of the returnable containers 61 and 62 of a plurality of predefined sizes in the x-axis direction are also the same as each other. On the other hand, the heights of the returnable containers 61 and 62 in the z-axis direction are different from each other. The height of the returnable container 61 of the smallest size is designed in accordance with an interval between the adjacent rails 43 in the z-axis direction. As a matter of course, the height of the returnable container 61 is smaller than the interval between these rails 43. The height of the returnable container 62 is designed to be about twice the height of the returnable container 61.

That is, the height of each of the returnable containers of a plurality of predefined sizes is designed to be about an integral multiple of the interval between the adjacent rails 43 in the z-axis direction.

Note that, in the example shown in FIG. 2, although two sizes of the returnable containers are used, three or more sizes of the same may be used. In the example of FIG. 2, in addition to the returnable containers 61 and 62, other returnable containers having, for example, a height about three and/or four times the height of the returnable container 61 may be provided.

Note that the returnable containers 61 and 62 may be provided with a carrying handle. This carrying handle is different from a drawer handle for using the returnable containers 61 and 62 as drawers.

Figure 4:
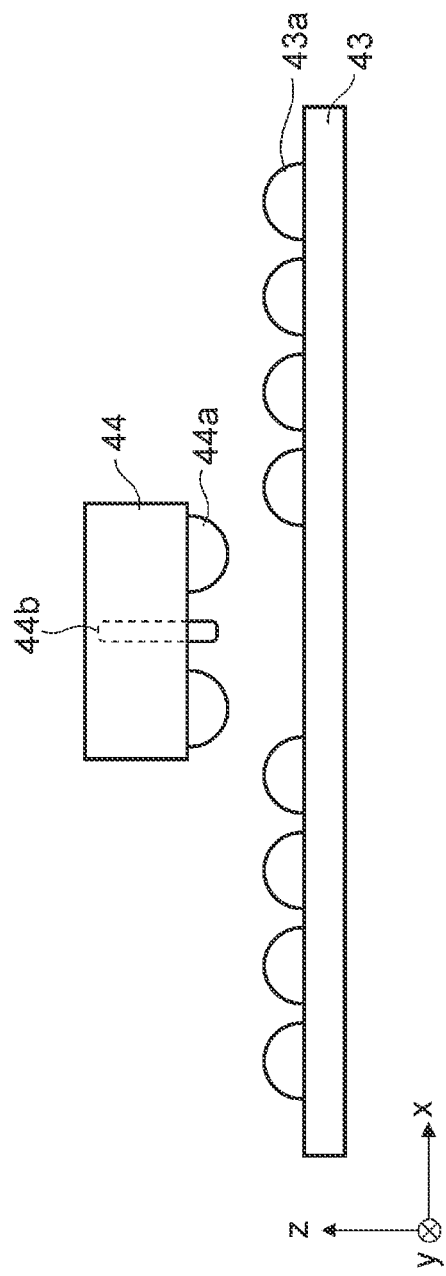
FIG. 4 is a schematic side view showing a rail 43 and a lock mechanism 44.
Figure 5:
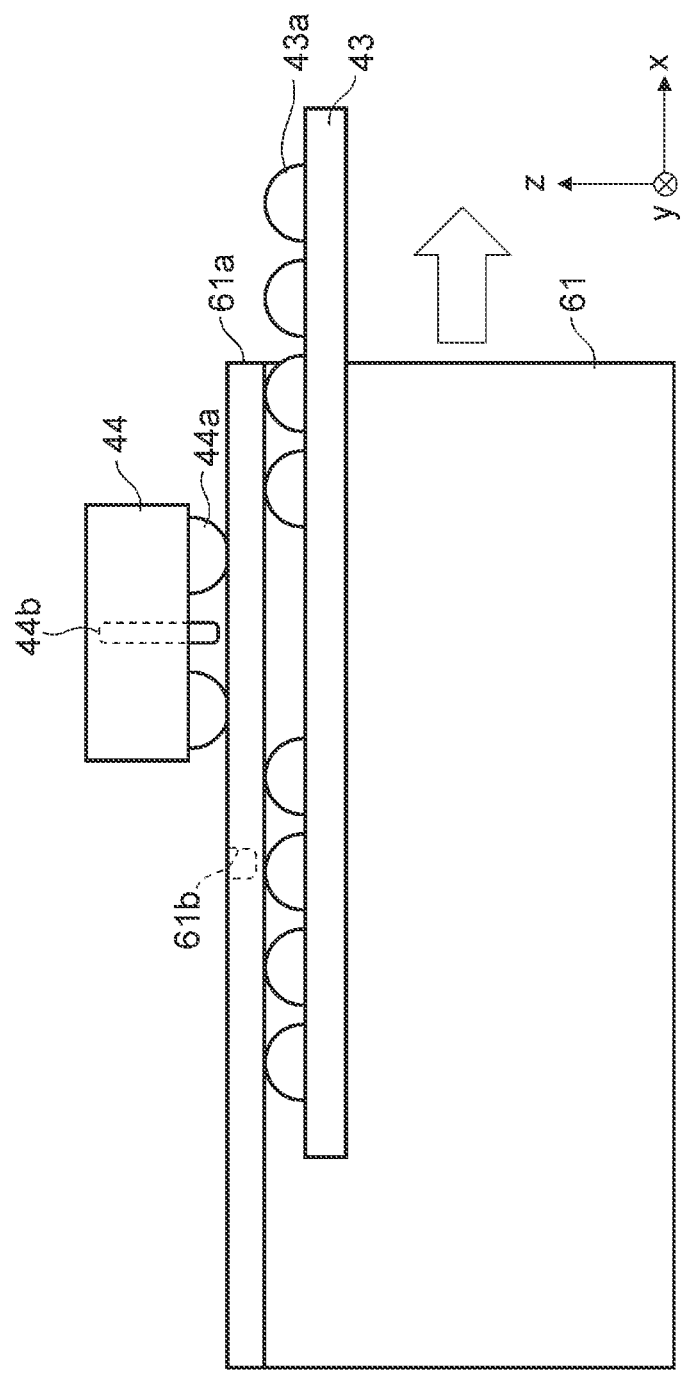
FIG. 5 is a schematic side view showing the rail 43 and the lock mechanism 44.
Figure 6:
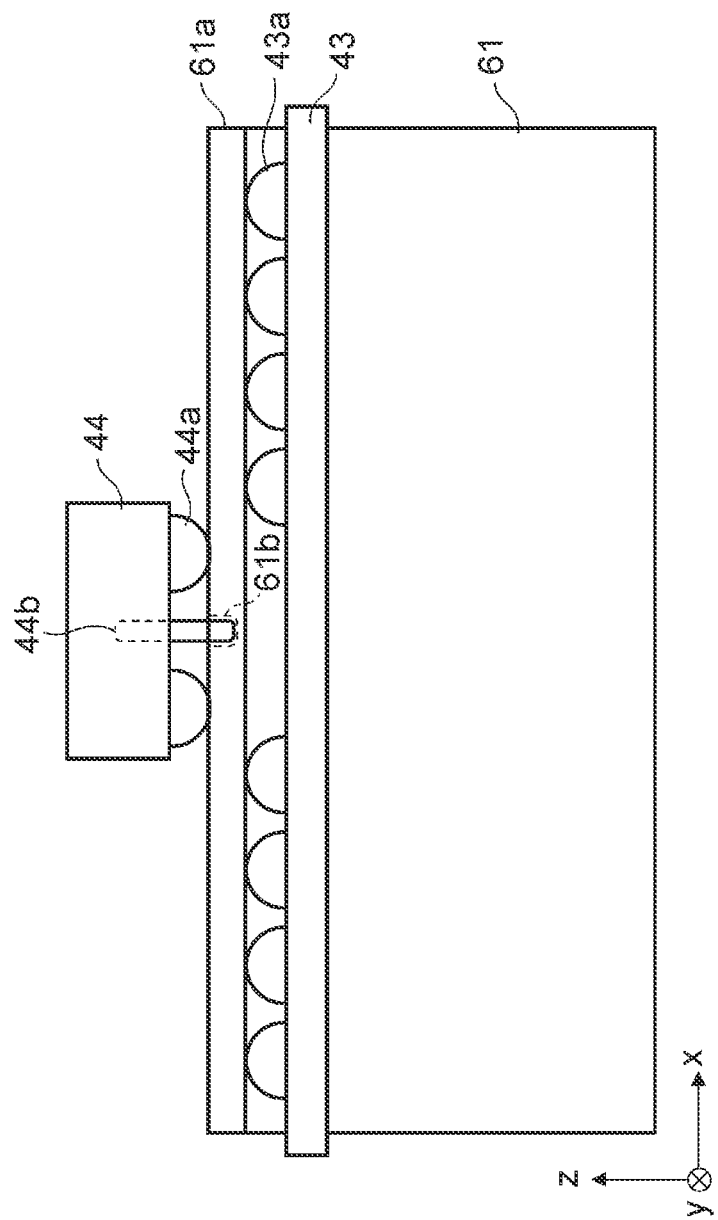
FIG. 6 is a schematic side view showing the rail 43 and the lock mechanism 44.

The rail 43 and the lock mechanism 44 will be described in detail below with reference to FIGS. 4 to 6. FIGS. 4 to 6 are schematic side views each showing the rail 43 and the lock mechanism 44. FIGS. 4 to 6 show the positional relation between the rail 43 and the lock mechanism 44 and the returnable container 61 as viewed from the y-axis direction negative side in FIG. 2. The positional relation between the rail 43 and the lock mechanism 44 and the returnable container 62 is similar to that between the rail 43 and the lock mechanism 44 and the returnable container 61.

As shown in FIG. 4, the rail 43 is a roller rail and includes a roller 43a. The roller 43a is made of, for example, plastic.

The roller 43a makes it possible to reduce the friction coefficient between the projecting part 61a of the returnable container 61 and the rail 43 and prevent abrasion powder from being generated by the sliding of the projecting part 61a.

Further, the lock mechanism 44 shown in FIG. 4 is a solenoid lock and includes rollers 44a and a pin 44b. The lock mechanism 44 is provided so as to face each rail 43. Further, as shown in FIGS. 5 and 6, the lock mechanism 44 is provided so as to allow the projecting part 61a of the returnable container 61 to slide, and the rollers 44a are provided on the surface of the lock mechanism 44 on which the projecting part 61a slides. The roller 44a is made of, for example, plastic. The rollers 44a make it possible to reduce the friction coefficient between the projecting part 61a of the returnable container 61 and the lock mechanism 44 and prevent abrasion powder from being generated by the sliding of the projecting part 61a.

As shown in FIG. 5, while the returnable container 61 is sliding on the rail 43, the lock mechanism 44 is released. Therefore, the pin 44b is in a state in which it is retracted upward.

On the other hand, as shown in FIG. 6, when the returnable container 61 stops at a predetermined position on the rail 43, the lock mechanism 44 operates. Specifically, the pin 44b is advanced downward and fitted into a recessed part 61b provided in the projecting part 61a of the returnable container 61, whereby the returnable container 61 is fixed to the housing 41 and a lid (not shown) of the returnable container 61 is locked. As a matter of course, when the lock mechanism 44 is released, the returnable container 61 can be moved again as shown in FIG. 5.

Note that the lock mechanism 44 is not limited to a solenoid lock, and any lock mechanism that can regulate the operation of the returnable container 61 and lock the lid of the returnable container 61 may be used. For example, the pin 44b may operate mechanically. Alternatively, a rotary lock mechanism in which the pin 44b is not used may be used. Further, the locking of the operation of the returnable container 61 and the locking of the lid of the returnable container 61 may be separately performed.

Modified Example of Delivery Vehicle 40

Figure 7:
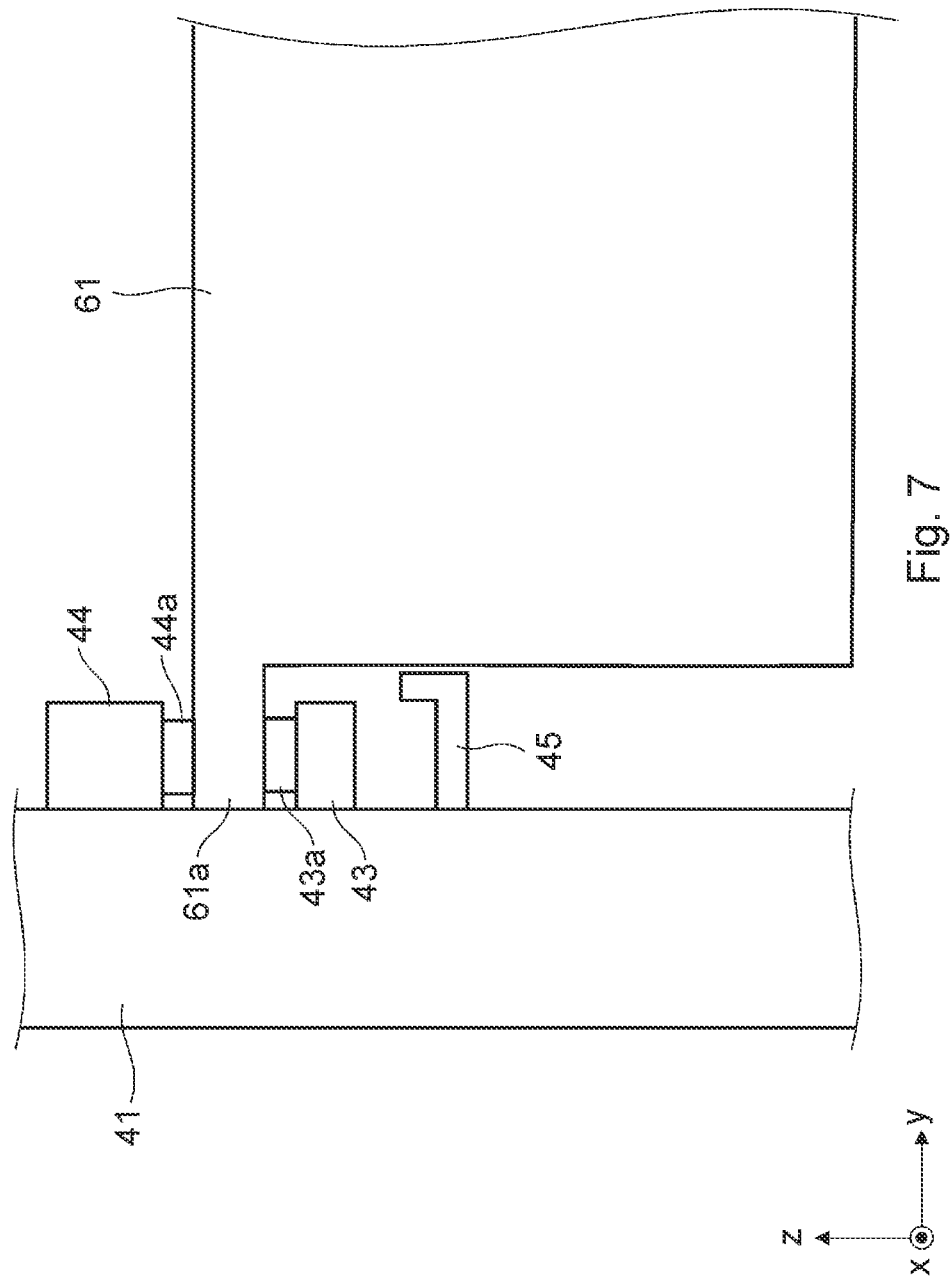
FIG. 7 is a schematic enlarged side view of a delivery vehicle according to a modified example of the first embodiment.

The delivery vehicle 40 according to a modified example of this embodiment will be described below with reference to FIG. 7. FIG. 7 is a schematic enlarged side view of the delivery vehicle according to the modified example of the first embodiment.

As shown in FIG. 7, the delivery vehicle 40 according to the modified example includes, in addition to the housing 41, the partition plate 42, the rail 43, and the lock mechanism 44 shown in FIG. 2, a gutter 45. FIG. 7 shows the positional relation between the rail 43, the lock mechanism 44, and the gutter 45 and the returnable container 61. This positional relation is similar to that between the rail 43, the lock mechanism 44, and the gutter 45 and the returnable container 62.

The gutter 45 is extended below and in parallel with each rail 43.

Although not limited to any particular shape, the gutter 45 has, for example, an L-shaped cross-sectional shape as shown in FIG. 7.

The gutter 45 makes it possible to catch abrasion powder generated by the sliding of the projecting part 61a of the returnable container 61 and the rail 43, a lubricant of the rail 43, and the like. Therefore, it is possible to prevent abrasion powder and a lubricant from entering inside the returnable containers 61 and 62 that are positioned below the returnable container 61 of which the projecting part 61a has slid.

The rest of the configuration is similar to that of the first embodiment shown in FIG. 2, and therefore the description thereof is omitted.

<Configuration of Delivery Shelf 50>

Next, the configuration of the delivery shelf 50 will be described with reference to FIG. 3.

As shown in FIG. 3, the delivery shelf 50 includes the housing 51, partition plates 52, the rails 53, and lock mechanisms 54.

The housing 51, the partition plate 52, the rail 53, and the lock mechanism 54 of the delivery shelf 50 correspond to the housing 41, the partition plate 42, the rail 43, and the lock mechanism 44 of the delivery vehicle 40, respectively, and have configurations similar to those of the housing 41, the partition plate 42, the rail 43, and the lock mechanism 44 of the delivery vehicle 40 of the delivery vehicle 40, respectively. Therefore, detailed descriptions thereof will be omitted.

Note that the articles may be stored in the empty returnable containers 61 and 62 in the delivery shelf 50 and then sent. That is, the delivery shelf 50 can be used for both receiving and sending articles in the delivery using the returnable containers 61 and 62.

Second Embodiment

Figure 8:
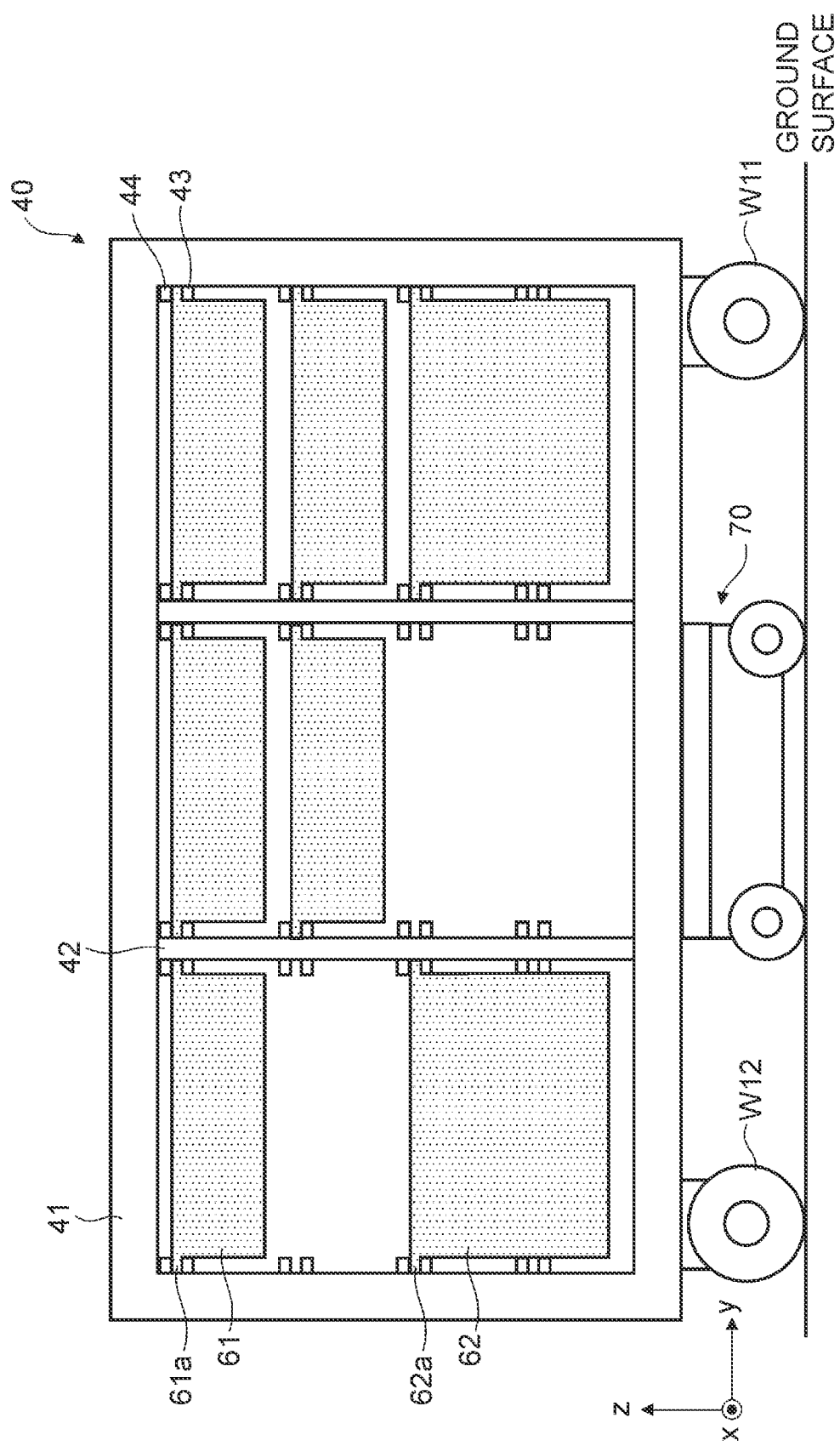
FIG. 8 is a schematic side view of a delivery vehicle according to a second embodiment.

Next, a delivery vehicle according to a second embodiment will be described with reference to FIG. 8. FIG. 8 is a schematic side view of the delivery vehicle according to the second embodiment.

Note that the configuration of the delivery vehicle 40 itself is similar to that of the delivery vehicle 40 shown in FIG. 2. On the other hand, as shown in FIG. 8, in this embodiment, while the delivery vehicle 40 is delivering the returnable containers 61 and 62, a transportation robot 70 is housed under the delivery vehicle 40 and is mechanically or electromagnetically coupled thereto.

The transportation robot 70 shown in FIG. 8 is an autonomous traveling vehicle that transports the returnable containers 61 and 62 (i.e., the articles) from the delivery vehicle 40 to the delivery shelf 50 after the delivery vehicle 40 arrives in the vicinity of the delivery shelf 50.

Figure 9:
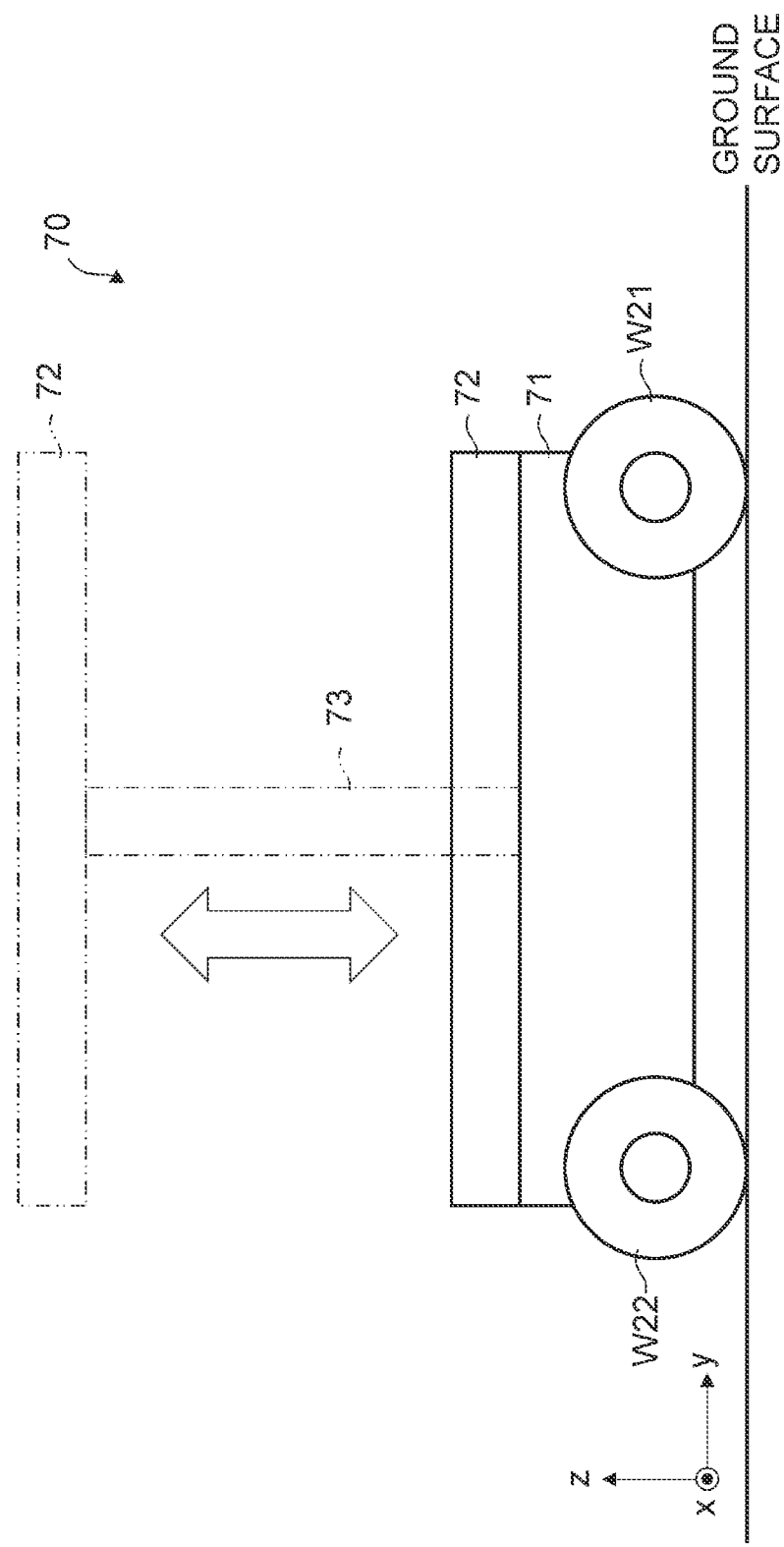
FIG. 9 is a schematic side view of a transportation robot 70.

Here, FIG. 9 is a schematic side view of the transportation robot 70.

As shown in FIG. 9, the transportation robot 70 includes wheels W21 and W22, a main body part 71, a top plate 72, and a support pole 73.

The two pairs of the wheels W21 and W22 are rotatably fixed to the underside of the main body part 71 and are driven by a drive source (not shown) such as a motor.

As shown in FIG. 9, the top plate 72 is coupled to the main body part 71 via the support pole 73 that can be extended and contracted. The top plate 72 is coupled to the upper end of the support pole 73, and the transportation robot 70 places the returnable containers 61 and 62 on the top plate 72 and then transports them.

The support pole 73 has, for example, a telescopic type extending and contracting mechanism, and is extended and contracted by a drive source (not shown) such as a motor. As indicated by an outline arrow in FIG. 9, the height of the top plate 72 can be changed by changing the length of the support pole 73. Therefore, the returnable containers 61 and 62 can be transported from any housing place in the delivery vehicle 40 to any housing place in the delivery shelf 50.

Here, the transportation robot 70 includes, for example, a manipulator (not shown), and the returnable containers 61 and 62 are moved from the delivery vehicle 40 to the top plate 72 by the manipulator and then transported. Then the returnable containers 61 and 62 on the top plate 72 are moved to the delivery shelf 50 by the manipulator.

Note that, in the configuration shown in FIG. 9, the transportation robot 70 may serve as a power source to move the delivery vehicle 40. That is, the delivery vehicle 40 may not have a drive source for driving the wheels W11 and W12. In this case, a plurality (e.g., two) of transportation robots 70 may be arranged in the y-axis direction to move the delivery vehicle 40.

Meanwhile, the transportation robot 70 may be mounted on the delivery vehicle 40 or may travel along with the delivery vehicle 40.

The rest of the configuration is similar to that of the first embodiment, and therefore the description thereof is omitted.

In the above-described examples, the various control programs can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (Compact Disc Read Only Memory), CD-R (Compact Disc Recordable), CD-R/W (Compact Disc Rewritable), and semiconductor memories (such as mask ROM, PROM (Programmable ROM), EPROM (Erasable PROM), flash ROM, RAM (Random Access Memory), etc.). Further, the program may be provided to a computer using any type of transitory computer readable media. Examples of transitory computer readable media include electric signals, optical signals, and electromagnetic waves. Transitory computer readable media can provide the program to a computer through a wired communication line (e.g., electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A delivery vehicle comprising:
   a housing; and
   a plurality of pairs of supports extended inside the housing in a depth direction thereof and arranged inside the housing at regular intervals in a height direction thereof; and
   a shelf capable of housing all of returnable containers for delivery of a plurality of predefined sizes along the plurality of respective pairs of supports,
   wherein a gutter is provided below each of the plurality of pairs of supports, the gutter being extended in parallel with each of the plurality of pairs of the supports.

2. The delivery vehicle according to claim 1, wherein a projecting part that projects outward from each of the returnable containers in a width direction thereof slides on each of the plurality of pairs of supports.

3. The delivery vehicle according to claim 2, wherein a roller is provided on a surface of each of the plurality of pairs of supports on which the projecting part slides.

4. The delivery vehicle according to claim 2, further comprising a lock mechanism configured to lock the returnable container when the returnable container is housed.

5. The delivery vehicle according to claim 4, wherein
   the lock mechanism is provided so as to face each of the plurality of pairs of supports and allow the projecting part of each of the returnable containers to slide, and
   a roller is provided on a surface of the lock mechanism on which the projecting part slides.

6. The delivery vehicle according to claim 1, wherein the delivery vehicle is an autonomous traveling vehicle.

\* \* \* \* \*